(No Model.)
W. GOLDSWORTHY.
FRICTION CLUTCH.
No. 463,894. Patented Nov. 24, 1891.
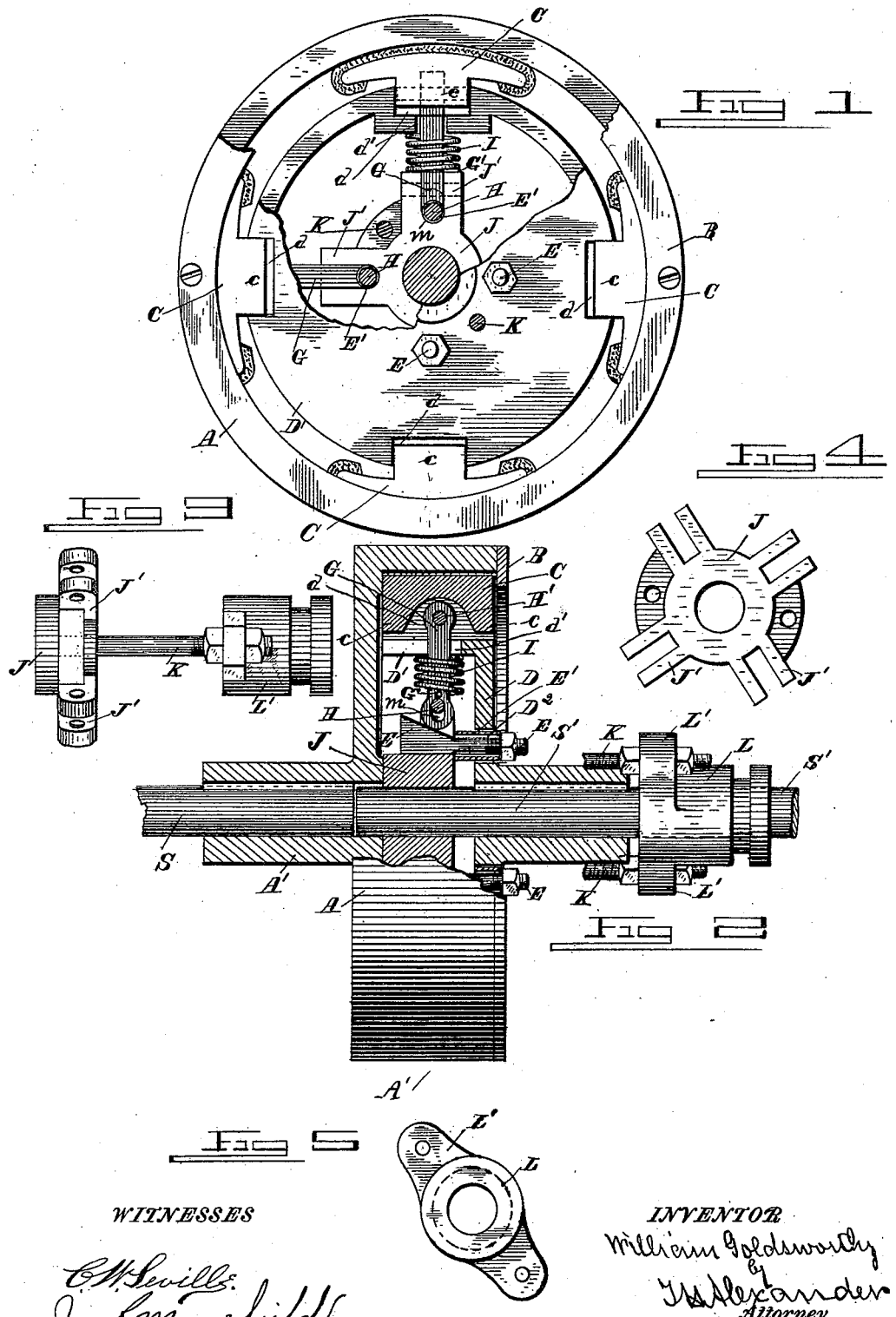
WITNESSES
INVENTOR
William Goldsworthy
by T. S. Alexander
Attorney

UNITED STATES PATENT OFFICE.

WILLIAM GOLDSWORTHY, OF MOLINE, ILLINOIS.

FRICTION-CLUTCH.

SPECIFICATION forming part of Letters Patent No. 463,894, dated November 24, 1891.

Application filed June 3, 1891. Serial No. 394,937. (No model.)

*To all whom it may concern:*

Be it known that I, WILLIAM GOLDSWORTHY, of Moline, in the county of Rock Island and State of Illinois, have invented certain new and useful Improvements in Friction-Clutches; and I do hereby declare that the following is a full, clear, and exact description thereof, reference being had to the accompanying drawings, and to the letters of reference marked thereon, which form part of this specification, in which—

Figure 1 is a face view, partly broken away, of my improved friction-clutch. Fig. 2 is a central vertical transverse sectional view of the same. Figs. 3, 4, and 5 are detail views.

This invention is an improvement in friction clutches or couplings, being especially designed for use as a coupling to connect line-shafting with a driven shaft; and it consists in novel devices for operating a number of radially-movable shoes or friction-blocks confined between and within flanged disks or rims of pulleys, and in novel devices for adjusting the shoes independently to regulate the grip thereof, all of which will be clearly understood from the following description and claims.

Referring to the drawings by letter, S designates a driven shaft, and S' a shaft adjoining and in line with shaft S.

A designates a flanged disk or pulley keyed on the end of shaft S, with its flange A' overreaching the end of shaft S', which latter also partly enters the bore of the hub of disk A, but is not connected therewith.

D designates an oppositely-facing smaller disk or pulley keyed on shaft S' near the end thereof, and having its flanged periphery D' lying within the flange A'. The flange D' is formed with equidistant transverse recesses $d$, having slots $d'$ in their bottoms, and in these recesses fit the shanks $c$ of the friction-shoes C, which are interposed between the flanges of disks A D, as shown. The shoes are preferably covered with leather or other material to increase friction.

J designates an annulus slipped on the end of shaft S' between disks A D, and having a series of radially-projecting pairs of ears J' corresponding in number to the shoes C, and between the ears are pivoted on rivets H the inner ends of links G, which pass through slots $d'$, and are pivotally connected at their other ends to shoes C by rivets H'. The openings $m$ in links G, through which rivets H pass, are elongated.

E E designate gibs lying between ears J', and having their angular faces bearing against the inner ends of links G, while their rounded threaded shanks project through openings $D^2$ in disks D, and are nutted, as shown, short sleeves E' being interposed between the nuts and ears J', so that by tightening or loosening the nuts the gibs are drawn in or out, and thereby links G and shoes C adjusted radially toward or from the flange of disk A.

I I are coiled springs on link G and bearing against flange D' and pins G' on the links, so as to force the latter inward, and thus draw shoes C out of contact with disk A. B is an annulus attached to the edge of flange A' and serving to guide and retain the shoes C in position.

L is a grooved collar mounted on shaft S' exterior to disk D and having opposite lugs. L' and K are bolts passing through openings in disk D and having their inner ends fast to annulus J, and their outer ends secured to lugs L' by adjusting and binding nuts, as shown. By shifting collar L on the shaft annulus J is forced toward or from disk D, and as it is drawn toward the disk D links G are forced to assume a perpendicular to the shaft, and in so doing throw shoes C outward and into contact with the flange A' with greater or less power and friction, according to the adjustment of gibs E, and as these shoes cannot move laterally in relation to disk D the disks D and A are forced to move together so long as the shoes are in contact with the flange A', so that if one shaft be driven motion will be transmitted through the clutch or coupling to the other; or if the devices be mounted on the same shaft, one disk being loose thereon, however, it constitutes an excellent friction-pulley.

When using the device as a coupling for sectional shafting, as shown in drawings, I preferably mount disk A on the driving-shaft and the other parts on the driven shaft, so that the latter can be stopped and the parts adjusted without stopping the driving-shaft.

It will be observed that all the small working parts of the clutch are concealed and protected between the disks, keeping them freer from dust and lessening the liability to accidental breakage.

Having described my invention, what I claim as new, and desire to secure by Letters Patent thereon, is—

1. The combination of the flanged disks, the radially-movable shoes, the movable annulus between the disks, the links pivotally connecting the shoe and annulus, and mechanism for shifting said annulus and the gibs for adjusting said links, substantially as specified.

2. The combination of the flanged disk, the inner flanged disk having recesses in its flange, the radially-movable shoes seated in said recesses, the links pivotally connected to the shoes and depending between the disks, and the devices for shifting said links to throw the shoes outward and springs for drawing the shoes inward, substantially as set forth.

3. The combination of the flanged disk, the inner flanged disk having recesses in its flange, the radially-movable shoes seated in said recesses and between the flanges of the disks, the links pivotally connected to the shoes and depending between the disks, and the devices for simultaneously shifting said links and the gibs for independently adjusting said links and shoes, substantially as described.

4. The combination of the flanged disk, the inner flanged disk having recesses in its flange, the radially-movable shoes seated in said recesses, the links pivotally connected to the shoes and depending between the disks, and the devices for shifting said links, the springs adapted to draw the shoes inward, and the gibs for adjusting the links and shoes, substantially as set forth.

5. The combination of the flanged disks, the shoes interposed between the flanges thereof, the annulus interposed between the disks, and the links pivotally connected to said annulus and to said shoes and the springs on the links for throwing them inward, with the sliding collar and connecting-bolts for shifting said annulus independently of the disks, substantially as described.

6. The combination of the flanged disks, the shoes interposed between the flanges thereof, the annulus interposed between the disks, and the links pivotally connected to said annulus and to said shoes, with the sliding collar and connecting-bolts for shifting said annulus independently of the disks and the gibs for independently adjusting the links, substantially as and for the purpose specified.

In testimony that I claim the foregoing as my own I affix my signature in presence of two witnesses.

WILLIAM GOLDSWORTHY.

Witnesses:
ROBERT MALCOLM,
JOHN ALMLAF.